United States Patent
Cheng et al.

(10) Patent No.: US 12,157,051 B2
(45) Date of Patent: Dec. 3, 2024

(54) INTERFACES AND PROCESSES FOR BIOLOGICAL CHARACTERISTICS HANDLING IN HEAD-MOUNTABLE DEVICES

(71) Applicant: HEWLETT-PACKARD DEVELOPMENT COMPANY, L.P., Spring, TX (US)

(72) Inventors: Yow-Wei Cheng, Taipei (TW); Peter Christian Peterson, Fort Collins, CO (US); Kaden Strand, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 235 days.

(21) Appl. No.: 17/782,460

(22) PCT Filed: Dec. 4, 2019

(86) PCT No.: PCT/US2019/064378
§ 371 (c)(1),
(2) Date: Jun. 3, 2022

(87) PCT Pub. No.: WO2021/112836
PCT Pub. Date: Jun. 10, 2021

(65) Prior Publication Data
US 2023/0166178 A1   Jun. 1, 2023

(51) Int. Cl.
*G02B 27/01*     (2006.01)
*A61B 5/00*      (2006.01)
(Continued)

(52) U.S. Cl.
CPC ............ *A63F 13/212* (2014.09); *A63F 13/77* (2014.09)

(58) Field of Classification Search
CPC ......... A61B 5/0006; A61B 5/16; A61B 5/318; A61B 5/369; A61B 5/486; A61B 5/7264;
(Continued)

(56) References Cited

U.S. PATENT DOCUMENTS

| 9,041,530 B2 | 5/2015 | Sprigg et al. |
| 2012/0200499 A1 | 8/2012 | Osterhout et al. |

(Continued)

FOREIGN PATENT DOCUMENTS

| CN | 103632127 A | 3/2014 |
| CN | 107622188 A | 1/2018 |

(Continued)

OTHER PUBLICATIONS

Quintana-Nevarez et al., "Biometric authentication based on eye movements by using scan-path comparison algorithms"; Conference: Workshop on International Regional Consortium for Foundations, Research and Spread of Emerging Technologies in Computing Sciences, 2017, At Ciudad Juárez, Chihuahua, México; Dec. 2017, pp. 33-38.

(Continued)

*Primary Examiner* — Lawrence S Galka
(74) *Attorney, Agent, or Firm* — Quarles & Brady LLP

(57) ABSTRACT

According to aspects of the present disclosure, there are provided methods and apparatus for providing a user characteristics determination module for use with a head-mountable display device, comprising: a biological characteristics handler to determine whether biological sensor data is indicative of a predefined biological characteristic of the user; and determination logic to determine and output a predefined response to the determined biological characteristic of the user.

19 Claims, 5 Drawing Sheets

(51) Int. Cl.
*A63F 13/212* (2014.01)
*A63F 13/77* (2014.01)

(58) Field of Classification Search
CPC ........ A61B 5/744; A63F 13/212; A63F 13/60;
A63F 13/77; A63F 13/79; G06F 3/011;
G06F 3/012; G06F 3/015; G06F
2203/011
See application file for complete search history.

(56) References Cited

U.S. PATENT DOCUMENTS

| | | |
|---|---|---|
| 2013/0007668 A1 | 1/2013 | Liu et al. |
| 2015/0302252 A1 | 10/2015 | Herrera |
| 2016/0077547 A1 | 3/2016 | Aimone et al. |
| 2017/0322679 A1* | 11/2017 | Gordon ................... G06F 3/013 |
| 2020/0310117 A1* | 10/2020 | Qian ..................... G02B 27/017 |

FOREIGN PATENT DOCUMENTS

| | | |
|---|---|---|
| WO | 2015/047032 A1 | 4/2015 |
| WO | 2016/126522 A1 | 8/2016 |
| WO | 2019/067779 A1 | 4/2019 |

OTHER PUBLICATIONS

Mario Scrocca et al: "Jazzy", Human Factors in Computing Systems, ACM, 2 Penn Plaza, Suite 701New YorkNY10121-0701USA, Apr. 20, 2018 (Apr. 20, 2018), pp. 1-6.

* cited by examiner

|  | Exception (Abort) | Output raw data | Algorithm compensation | Playback a default |
|---|---|---|---|---|
| Cyclopia (one-eyed) | ✓ | ✓ | ✓ |  |
| Arrhythmia (irregular heartbeat) | ✓ | ✓ |  | ✓ |
| Wearing circle (contact) lenses | ✓ | ✓ |  | ✓ |
| Anisocoria (pupil size not the same) | ✓ | ✓ | ✓ |  |
| Strabismus (eyes non-aligned) | ✓ | ✓ | ✓ |  |

Figure 5

INTERFACES AND PROCESSES FOR BIOLOGICAL CHARACTERISTICS HANDLING IN HEAD-MOUNTABLE DEVICES

BACKGROUND

Head-mountable display (HMD) devices for use with virtual reality and/or augmented reality are devices which are becoming popular in both industrial and consumer applications. These devices include multiple sensors to collect control data for use by the HMD for control purposes.

BRIEF DESCRIPTION OF THE DRAWINGS

Various features of the present disclosure will be apparent from the detailed to description which follows, taken in conjunction with the accompanying drawings, which together illustrate features of the present disclosure.

FIG. 5 shows a table of biological characteristics to handle, and corresponding actions, according to examples of the disclosure.

DETAILED DESCRIPTION

Figure 1:
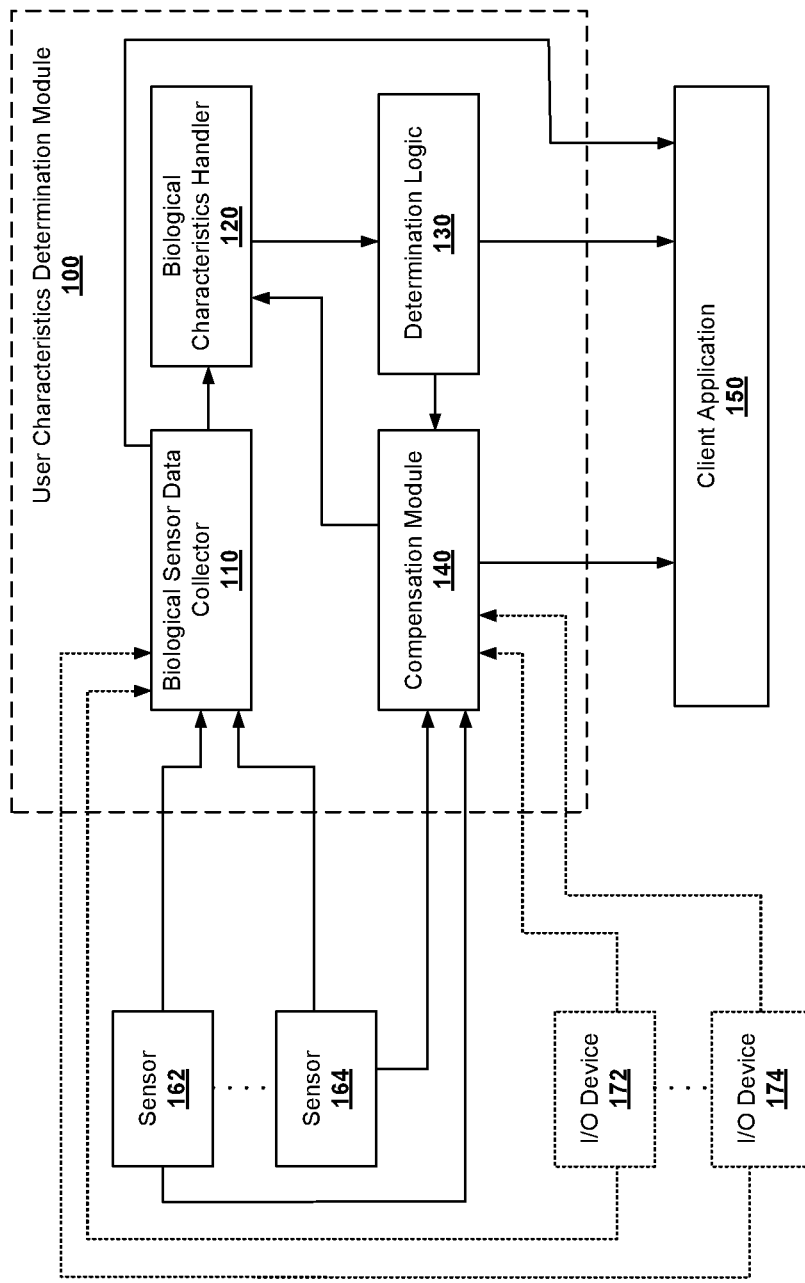
FIG. 1 shows an overview of a user characteristics determination module according to examples of the disclosure.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Head-mountable display (HMD) devices may include multiple sensors, for example, to collect control data for use by the HMD. However, HMDs may also include, be integrated with, or connected to biological sensors to obtain biological information about a user of the HMD device. Similarly biological sensors may also be used, for example, in independent controllers, or other devices associated with the HMD system, that may be used in conjunction with the HMD device, for example to interact with an immersive environment provided by the HMD to a user, or in other devices such as smart watches, smart wristbands or other forms of fitness trackers. Thus, the teachings herein, although framed in relation to an HMD device for the purpose of the described examples, may be applicable to a range of other electronic devices with embedded, or otherwise associated, biological sensors, and in particular electronic devices with embedded biological sensors that are mountable on a user (i.e. user mountable devices).

As various devices making use of biological sensors become widely adopted, and deployed to the field, certain unexpected biological characteristics may be encountered, and data about them gathered over time. These unexpected biological characteristics may lead to incorrect interpretation of biological sensor data by an application running on the HMD device (or host computing system) because they are arranged to operate with a normal baseline user in mind, but these unexpected biological characteristics may affect how a user of the HMD is able to interact with the immersive environment produced by the HMD, thereby leading to a lesser user experience (e.g. the particular unexpected biological characteristic exhibited by the user at that time may prevent them from experiencing the immersive environment as the software developer of that immersive environment intended). These unexpected biological characteristics may include, by way of example, physical disorders such as cyclopia (having one eye), arrhythmia (irregular heart beat), anisocoria (pupil size is not the same) or strabismus (eyes misaligned). In some examples, these unexpected biological characteristics may include further characteristics which are not related to a physical disorder per se, such as the wearing of contact lenses to change pupil colour and/or size. In all examples, these detectable conditions about the user (i.e. the user's biological characteristics) may materially affect the user experience provided by the HMD.

Data on these conditions may be gathered over time, since the respective systems that collect the biological data may be connected to a cloud service, or similar, which then may be able to gather data sets across vast numbers of users, and from that data derive ways to detect certain conditions, for example in an empirical way.

Devices such as an HMD typically act as a platform to run a range of software applications from independent software vendors (ISVs). Accordingly, the data provided by the sensors of (or at least associated with) the HMD device may be used by multiple software applications which have been independently developed. Accordingly, to account for unexpected or uncommon biological characteristics of a user, each software application would need to be capable of handling these uncommon edge-cases (i.e. independently designed to account for biological characteristics that are uncommon), and going to the effort of developing the software for these edge-cases may not be possible (due to time, cost or expertise restraints, for example) for a given ISV. Moreover, with multiple ISVs, detection of these edge-cases may be implemented in different ways and with varying success, especially, for example, when the unexpected biological characteristic is not of particular interest to the ISV.

Accordingly, in general terms, the present disclosure provides a middleware platform (i.e. a combination of software and hardware) logically located between the HMD, or other user mountable device, and the computing system that operates with the HMD (or other user mountable device) to provide the user an immersive environment enabled by the HMD (or other user mountable device). The disclosed middleware platform is operable to receive biological user data from various sensors (or a single sensor, in some examples) on, around or in the HMD, and from that biological user data, detect a user characteristic (for example according to a comparison to known, predefined, user characteristic data), and based upon the detected user characteristic, take an appropriate action. The appropriate action may be predefined according to configuration data for the overall platform, which may, for example, comprise data, or configuration parameters, that indicates what to look for (i.e. the user biological characteristics data of interest), and what to do in a given detected situation. The configuration parameters may be received by the disclosed system, or otherwise set, as discussed below with reference to FIG. 5. Examples of the sorts of appropriate action include, but are not limited to: raising an exception or flag, blocking further action, ignoring the detected user characteristic, initiating a bypass function, or even applying a predetermined compensation regime, that effectively counters the effect of the detected user characteristic, so that the downstream ISV provided software can proceed on the basis of the user being normal, i.e. assumed in line with a baseline user characteristic. This latter result effectively enables the ISV to hand off all detection and remedial action to the disclosed middleware, so that so that the ISV can treat all users the same, and hence reduce bespoke software development for these edge cases.

The present disclosure may provide the aforementioned middleware in the form of a system and method for the detecting and handling of these unexpected biological characteristics, operated by a background process or daemon executed at a suitable point in the HMD system. In one example, the middleware platform may be a software driver module executing on a host computing system to which the HMD is attached, and which provides the processing resources to generate and operate the user immersive environment displayed on, or otherwise enabled by, the HMD. Accordingly, each ISV can direct their development efforts towards a biological data set in which they are interested (in most examples, this may be a "normal" user baseline characteristic), and leave the handling of the unexpected or uncommon, edge-case, user biological characteristics to the background process of the middleware platform. This new approach eliminates the duplication of work by multiple ISVs to account for these edge-cases, and as a result simplifies the development process of the independent software to run on the HMD platform. In some examples, the handling of the unexpected biological characteristics can be performed in a more consistent manner, and, overall, more edge-case user characteristics may be accounted for over time, since all that development is carried out centrally by the middleware platform provider. In any case, examples according to the present disclosure may further permit ISVs to handle the raw biological sensor data for some edge-cases (instead of the middleware platform handling them), where appropriate, for example when the specified (i.e. predetermined) unexpected or uncommon biological characteristic of the user that is detected is of interest to the ISV for a particular software application.

According to an example, a client application (i.e. a software application developed by an ISV) may provide configuration parameters (in a predetermined format) to a user characteristics determination module of the disclosed middleware platform. The user characteristics module may be an executable process that is generally operating in the background whilst the HMD is operational. The provided configuration parameters may also indicate biological characteristics of the user that are not of interest to the client application and therefore should be handled by the user characteristics determination module in the background.

In order to capture all known biological characteristics that might be detectable by an HMD with multiple biological sensors, a unified interface (comprising a user characteristics determination module according to the present disclosure) can be configured to take an appropriate action according to the detected user characteristics. These may include, but not be limited to: blocking and/or ignoring and/or bypassing and/or remedying data relating to certain biological characteristics before sending the data to the client application. Other operational outcomes may also be provided. For example, letting the client application know the situation by way of a flag, so that the client application can take its own appropriate action. For example, in a case where the client application provides a computer game, if an unusual heart rate is detected, then the client application may action a notification to the user that persons with abnormal heart conditions should not play the computer game. In some examples, the computer game execution may be altered to reduce the chances of causes heart rate increases of a user during play (e.g. adjusting content, or how it is displayed, and the like).

In more detail, if a particular predefined biological characteristic is detected, then the user characteristics determination module may perform a corresponding action. The corresponding action performed by the user characteristics determination module may be: to raise an exception with the client application, so that the client application may abort execution; to output raw biological sensor data directly to the client application, because the client application has the capabilities to handle the particular biological characteristic itself; to apply compensation to the raw biological sensor data to generate compensated biological sensor data, in order to amend, optimise and/or remedy the captured biological data about the user prior to sending to the client application; to play back a recorded sample of biological sensor data in place of the genuine real-time biological sensor data. The recorded sample of biological sensor data may be recorded by the client application, or may be recorded by the user characteristics determination module.

The user characteristics determination module is configured by one or more configuration parameters. The one or more configuration parameters may be provided to the user characteristics determination module from the client application in a configuration file, or otherwise set prior to operation. An application programming interface (API) may be used for the client application to form and/or send the configuration parameters in a suitable form, and this may be carried out dynamically, thereby providing the capability to alter the handling of the biological sensor data by the user characteristics determination module at any time during execution of the client application.

The user characteristics determination module as described herein may be deployed as a solution for a general security protocol. For example, a user's biological characteristics can be screened to detect anomalies before engaging a computer game application. In some examples, changes in the user's biological characteristics can be continuously monitored (i.e. detected) throughout playing of the game, and action taken accordingly. Thus, undesirable or unexpected situations arising through use of the HMD by a user (for example, arrhythmia, in physically active software experiences) can be filtered out, reported, and potentially remedial action taken, accordingly.

FIG. 1 illustrates a user characteristics determination module 100 according to the present disclosure, that may handle sensor data from one or more sensors 162, 164, and in some examples, for one or more Input Output (I/O) devices 172, 174, all for use by a client application 150 that drives an immersive environment provided by an HMD device. The sensors 162, 164 may be any form of biological sensors able to detect characteristics of a user of the HMD device. In the example shown in FIG. 1, the user characteristics determination module 100 comprises a biological sensor data collector 110 which may receive raw biological sensor data via one or more inputs from one or more sensors 162, 164. Examples of the sort of biological sensors that may be used include a heartbeat sensor, an eye sensor, or any other sensor that may be used to detect something physiological about a user, and which may be indicative of how the user is able to interact with the immersive environment provided by an HMD device connected with the user characteristics determination module 100. Biological sensor data collector 110 may then provide the raw (i.e. unaltered)

biological sensor data to a biological characteristics handler 120, which may then determine whether the raw biological sensor data is indicative of a predefined biological characteristic of the user. The predefined biological characteristic of the user may be anything that may have an effect on how a user of the HMD device will perceive or otherwise interact with the immersive environment provided by the HMD, under control of the client application, for example, cyclopia (having one eye), arrhythmia (having an irregular heartbeat), wearing contact lenses, anisocoria (pupil size being not the same) or strabismus (having non-aligned eyes). These listed predefined biological characteristics are examples, and other detectable biological characteristics are also envisaged. If the biological characteristics handler 120 determines that the raw biological sensor data is indicative of a predefined biological characteristic of a user, a determination logic 130 may determine a suitable output of the user characteristics determination module 100 to the client application that controls or generates the immersive environment provided by the HMD device. The suitable output may be any predefined response to the detected predefined biological characteristic of the user. Here, the use of 'predefined response' is to indicate a form of response that is known, or otherwise set, prior to its (first) use. The response may be predefined at an initialisation of the overall system, or may be defined dynamically during use, for example, by the client application over an Application Programming Interface (API). Similarly, the 'predefined biological characteristic of the user' is used to mean any known and set/defined form of user characteristic. Determination logic may include a combination of circuitry (e.g. a processor, associated memory, etc) and executable instructions that when executed by the circuitry, cause the circuitry to perform a determination regarding the biological sensor data, based upon pre-known, i.e. predefined, biological characteristic(s) of the user. The output of the destination logic may be any suitable form of response to a detected occurrence of said predefined biological characteristic of the user, and these responses may also be defined on initialisation, or during use, via an API.

In FIG. 1, the I/O devices 172, 174 may be any suitable I/O devices for use with a computing system hosting an HMD device driven by a client application, in order to provide an immersive environment to a user. Typical examples include, but are not limited to: input controllers (e.g. gamepads, joysticks and the like), audio devices (speakers, microphones, etc), displays (e.g. LCDs, LEDs, etc—here, we note these may be independent of the displays in the HMD device itself), communications links (e.g. network connections, etc), and the like. Data from the one or more input or output devices may be used by the compensation module 140 to apply compensation to the raw biological sensor data, or apply compensation to the data provided by the I/O devices.

The user characteristics determination module 100 may also include a compensation module 140, that is coupled to the sensors 162, 164, and in some examples the I/O devices 172, 174, that may apply a suitable compensation process, as described in more detail below.

Examples of the sorts of predefined responses to the determination that a user has a known biological characteristic that (is known to) materially affect how the user can interact with an immersive environment provided by an HMD device connected to the described user characteristics determination module may include: issuing (i.e. outputting) to the client application, an instruction (or any other form of message to convey the information) to abort the client application; issuing an exception instruction, which may also indicate the detected to issue to the client application (in some examples, together with the raw biological data, so that the client application can handle the issue in its own way); issuing a processing instruction, where the processing instruction instigates a compensation process to be applied to the user biological data by a compensation module 140; or outputting some form of pre-recorded version of the user biological data instead.

In the foregoing, the abort instruction may instruct the client application 150 to terminate execution, so that the immersive environment provided by the HMD ends, or at least pauses. This may be used, for example, when the detected biological characteristics of the user is such that proceeding with the immersive environment may be anywhere from merely sub optimal for the user (e.g. the user having a single eye is detected, and for this given client application that drives the immersive environment, the three dimensional aspect is not available), through to outright dangerous (e.g. a detected heart condition, meaning there could be a health issue for the user if they proceeded with the immersive environment).

The raise exception instruction may be used inform the client application 150 that a given predefined biological characteristic has been detected, and may be used in situations where the client application itself can act on that information, such that the client application 150 may determine an appropriate (further) response instead. In some examples, this exception handling may be accompanied by the user characteristics determination module 100 also outputting the raw (i.e. untouched by the user characteristics determination module 100) biological sensor data, for the client application to use as it sees fit. In this way, in some examples, the user characteristics determination module 100 may be transparent to the overall system driving the HMD provided immersive environment.

As noted above, in some example, the user characteristics determination module 100 may include a compensation module 140. Compensation module 140 may apply compensation to the raw biological sensor data to generate compensated biological sensor data. The compensation may be based on the detection of the predefined biological characteristic of the user, and the application of some form of further processing that may counteract (fully, or simply a reduction, or other amelioration) the effect of the detected biological characteristics of the user. For example, if a user with a single eye is detected, then the immersive experience provided by the HMD device may be altered accordingly (for example, the predefined response to this finding may be to simply replicate the content for both HMD screens, with no depth of field, and this would have the effect of reducing processing overhead). Another example may be when pupils of different sizes are detected, so that it is beneficial to drive the display brightnesses of the two HMD screens at different levels, in order to give the perception to the user of a uniform brightness. It is to be noted that the disclosed to user characteristics determination module 100 and associated controls are fully definable by the client application developer, in conjunction of with the HMD system, such that any conceivable way to handle the detection of any given difference about user can be suitably handled, in any given situation. Furthermore, what (user biological characteristic) exactly is being looked for, and what (action, on detecting that characteristic is present in a user) needs to be done in any given detected situation is readily definable by the ISV, and so any and all situations can be handled. Moreover, new ones can be added as and when they arise. Furthermore, since this is a shared middleware platform, subsequent users and ISVs can derive benefit from what previous users and ISVs have experienced. In some examples, feedback from the user's themselves may be used to better define the detectable characteristics, and what could be done as a result of their detection, for a given form or type of client application driving the HMD provided immersive environment.

The compensated biological data may be provided as an output of user characteristics determination module 100 to client application 150. The compensated biological data may further be provided to the biological characteristics handler 120 for further processing.

In some examples, the output may be a pre-recorded set of biological sensor data, for example to replace the live sensor data, because that may provide a benefit in the circumstances. For example, a client application may use detected pupil size or heart beat to determine whether a user's emotional state is calm or nervous, to automatically adjust the difficulty of a game environment, however if the real biological data from a user is missing or otherwise inappropriate for use, for example due to arrhythmia, the user characteristic determination module may instead load a pre-recorded biological data feed indicative of an easy, medium or hard game environment to provide to the client application in place of the actual biological data, instead of interrupting the application.

The user characteristics determination module 100 may be configured using one or more configuration parameters. The one or more configuration parameters may be provided to the user characteristics determination module 100 in a configuration file. The configuration file may be accessed as part of the initialisation of the overall host computing system, the client application, the HMD, or initialisation of any other portion of the host computing system, that is coupled to the HMD, in order to drive the immersive environment provided by the HMD device. The configuration file may be provided, or updated by the client application 150 itself, and may be accessed via an API.

Figure 2:
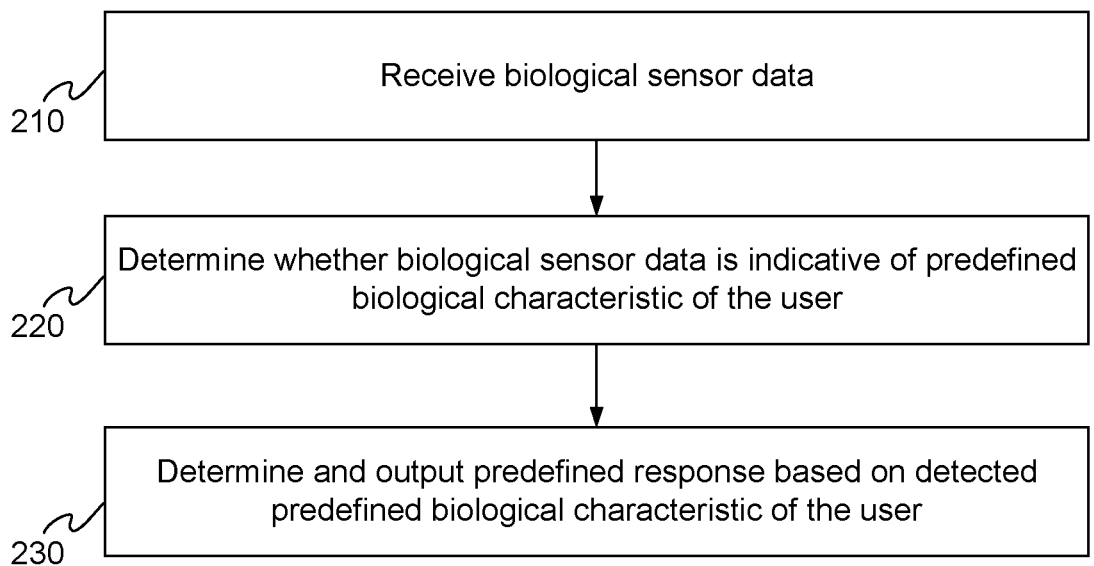
FIG. 2 shows a method according to examples of the disclosure.

FIG. 2 shows a basic method of handling predefined biological characteristics. At block 210, biological sensor data is received at the biological characteristics handler 120. This biological sensor data may be received via a biological sensor data collector, such as biological sensor data collector 110. In some examples, the biological sensor data may be received directly by the biological characteristics handler 120. At block 220, it is determined whether the received biological sensor data is indicative of a predefined biological characteristic of the user of the HMD device. This determination may be performed by the biological characteristics handler 120, and may be carried out by, for example, an attached eye sensor failing to identify information for one eye for a period of time (indicative of cyclopia). Another example may be the eye sensor detecting a pupil size variance exceeding a predefined threshold (indicative of anisocoria), the pupil sizes not changing with response to different brightness levels of the content displayed on the HMD (indicative of wearing circular contact lenses), or the heart beat sensor detecting a heartbeat that is less than or greater than a predefined threshold (indicative of bradycardia and tachycardia respectively). At block 230, an output predefined response is determined, based on the detected predefined biological characteristic of the user, based upon the configuration parameters, as detailed below with reference the FIG. 5. The output may be determined by determination logic, such as determination logic 130. The output may be provided to a client application, so the client application can take appropriate action (e.g. abort, handle the detected issue itself, or use compensated or pre-recorded sensor data instead).

Figure 3:
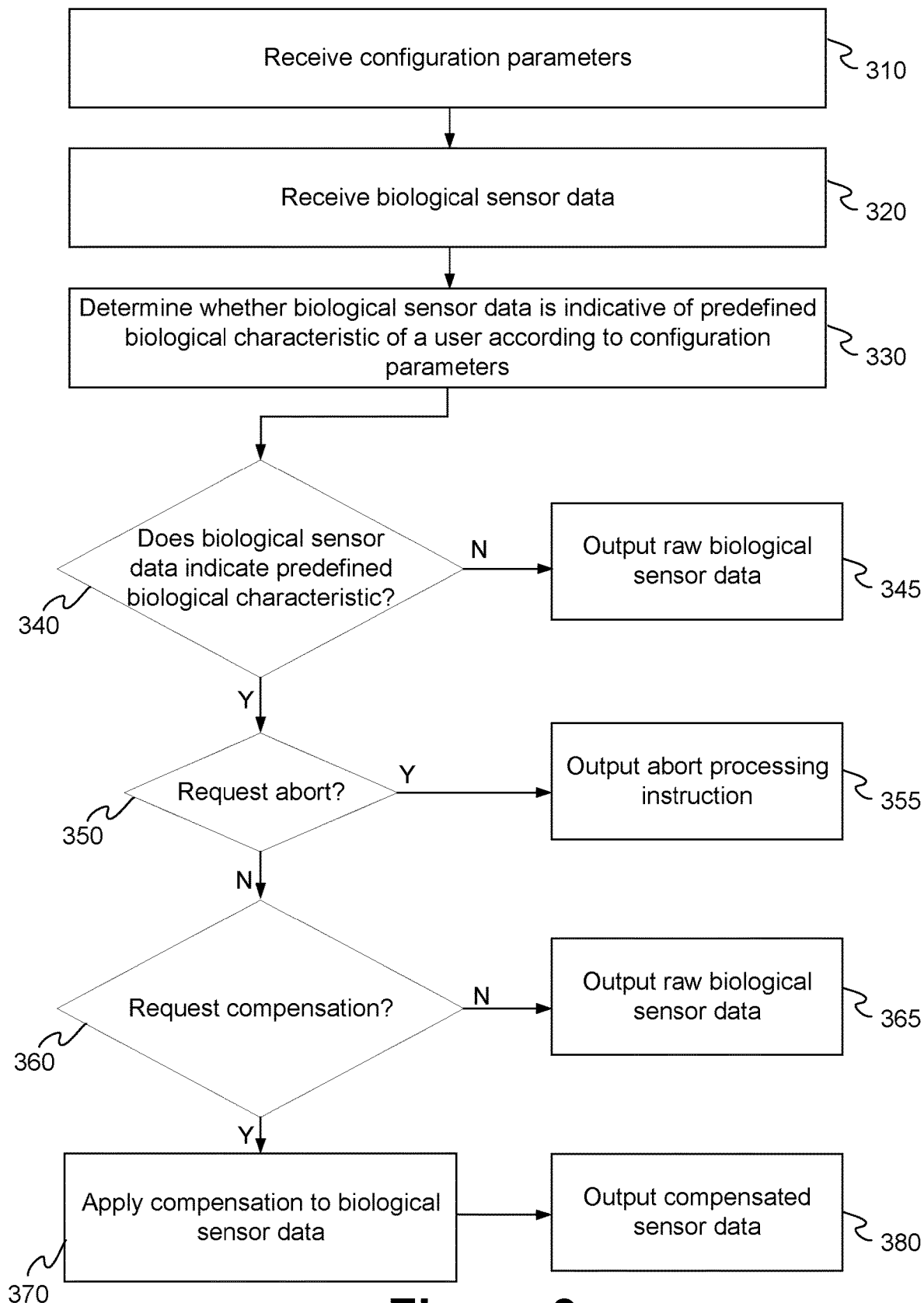
FIG. 3 shows an alternative method according to examples of the disclosure.

FIG. 3 shows an alternative, more detailed version, of a method of handling biological characteristics according to the present disclosure. At block 310, configuration parameters are received. The configuration parameters may be provided to biological characteristics handler 120 by client application 150, via an API. In some examples, the configuration parameters may be provided to the determination logic 130 by client application 150. The configuration parameters may be provided in a configuration file. The configuration parameters may include one or more predefined biological characteristics to detect. The configuration parameters may also include one or more predefined actions to be taken by user characteristics determination module 100 in response to detection of the one or more predefined biological characteristics of the user. The configuration parameters may further include further parameters relating to the one or more actions, or other aspects of the control or operation of the overall host computing system, the HMD device, and the like.

At block 320, biological sensor data is received. The biological sensor data may be received from one or more sensors 162, 164. The biological sensor data may be received by a biological sensor data collector 110, which can apply any pre-processing to the biological sensor data before passing the biological sensor data to the biological characteristics handler 120. The biological sensor data may be received directly by the biological characteristics handler 120 in some examples.

At block 330, it is determined whether the received biological sensor data is indicative of a predefined biological characteristic of the user, the predefined biological characteristic being defined according to the configuration parameters. As such, any suitable biological characteristics of a user may be defined in advance, and detected accordingly.

At block 340, it is determined whether a predefined biological characteristic was or was not detected. If it is determined that a predefined biological characteristic was not detected, the method proceeds to block 345, and outputs the raw, unadjusted sensor data. Meanwhile, if it is determined that a predefined biological characteristic of the user was detected, the method proceeds to block 350.

At block 350, it is determined whether the response to detection of the predetermined biological characteristic has been configured (e.g. using the configuration parameters) to be the output of an abort instruction 355, or it may be to output compensated biological sensor data instead. However, if it is determined that the configuration parameters have not configured the response to be the output of an abort instruction, then the method proceeds to block 360, where it is tested whether the appropriate action is to apply a compensation process to the biological sensor data (or the I/O device data as well as, or instead of, just the biological sensor data).

Thus, at block 360, it is determined whether the response to detection of the predetermined biological characteristic of the user has been configured to be compensation of the sensor, and/or I/O device, data. The response configuration may be set by the configuration parameters. If it is determined that the configuration parameters have configured the user characteristics determination module 100 to apply compensation to the biological sensor data (and/or I/O device data), then the method proceeds to block 370. Otherwise, the method proceeds to block 365. At block 365, the raw biological sensor data is output to the client application 150.

At block 370, a compensation process is applied to the biological sensor data to generate compensated biological sensor data. The compensation process may be applied using a compensation module executing a suitable compensation process. The compensation process may include applying machine learning to account for the detected biological characteristics of the user (i.e. the detected condition, abnormality, or variance from baseline of the user, or the like). For example, the machine learning may be applied to provide any suitable form of compensation, and this may be done to reduce or remove an effect of the detected user condition, or otherwise adjust the relevant data to allow the immersive environment provided by the HMD under control of the client application to proceed in a useful way for that user. As such, the compensation process applied may serve to amend, optimise or remedy the biological sensor data. The compensation may eliminate any unwanted or to unexpected characteristics of the biological sensor data.

At block 380 the compensated biological sensor data is output from the user characteristics determination module 100 to the client application 150.

It is to be noted that the operations of the flow charts of FIGS. 2 and 3 illustrate some of the possible scenarios. In some examples, some of the operations may be deleted or removed where appropriate, or the order of these operations may be changed. In some examples, some operations may be executed concurrently with, or in parallel to, other operations.

Figure 4:
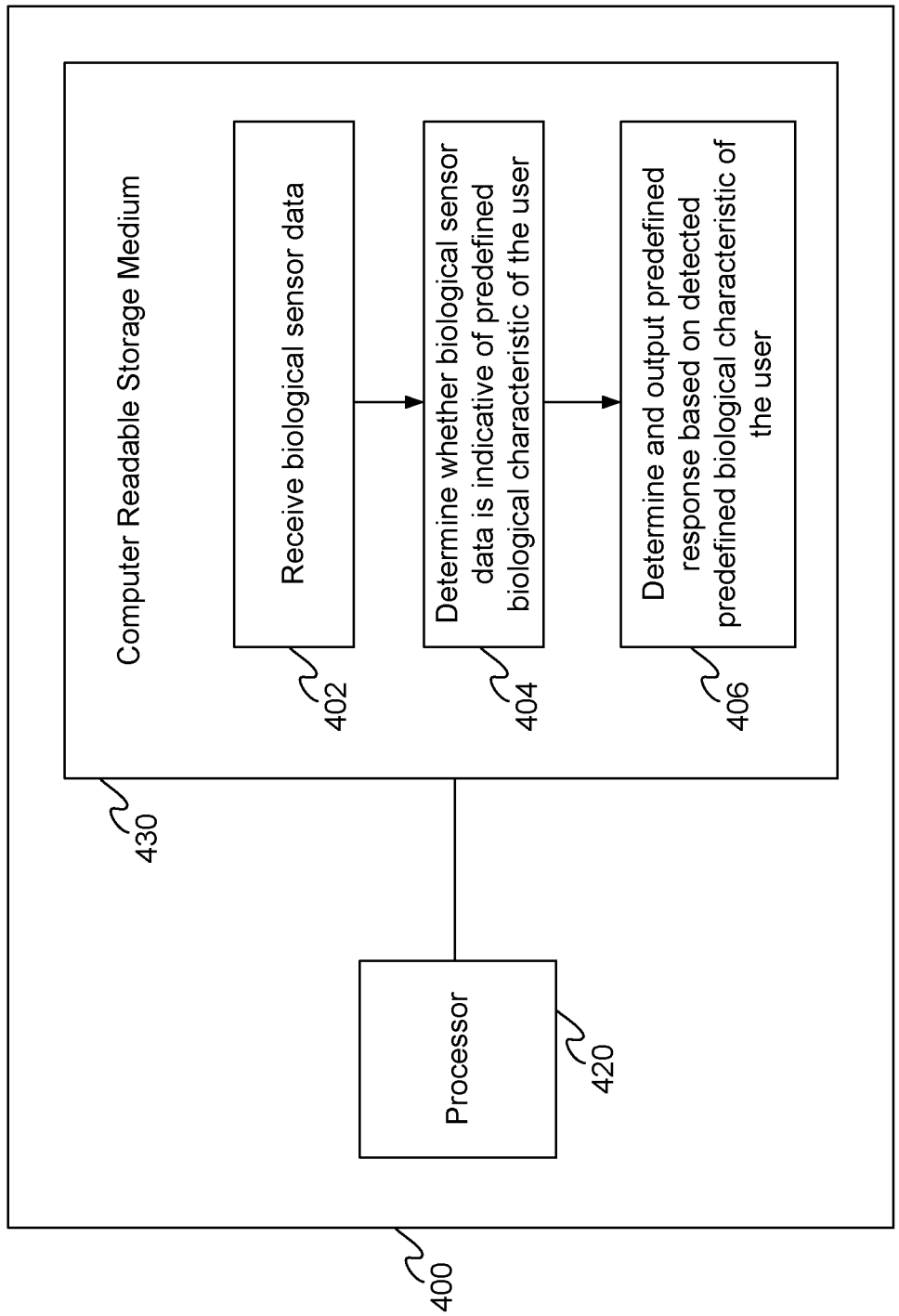
FIG. 4 shows a schematic block diagram of a computer system according to examples of the disclosure.

The apparatuses, modules, methods and systems as described herein may be implemented by a processor that processes and executes program code that is retrieved from a non-transitory storage medium. FIG. 4 shows an example of a such a processing device 400 comprising a computer-readable storage medium 430 coupled to at least one processor 420. The computer-readable medium 430 can be any medium that can contain, store, or maintain programs and/or data for use by or in connection with an instruction execution system or other system for giving effect to instructions. Computer-readable medium can comprise any one of many physical media such as, for example, electronic, magnetic, optical, electromagnetic, or semiconductor media. More specific examples of suitable machine-readable media include, but are not limited to, a hard drive, a random-access memory (RAM), a read-only memory (ROM), an erasable programmable read-only memory, or a portable storage such as, for example, a USB drive or disk. Examples of further machine readable media may not be limited by their specific form, but rather limited by their functionality to store data for manipulation and/or control manipulation of the same, similar or different data. In some examples, the program code may be executed by a processing core, a co-processor, or the like.

In FIG. 4, the computer-readable storage medium 430 comprises program code to perform a method or implement a device or module as described herein. For example, the program code when executed may implement a method corresponding to the example shown in FIG. 2, that is: receive 402 biological sensor data, determine 404 whether the biological sensor data is indicative of a predefined biological characteristic of the user; and determine 406 and output a predefined response to the determined predefined biological characteristic.

As described above, the disclosed user characteristic determination module 100 may have configuration parameters provided, or otherwise set, prior to or during operation, where the configuration parameters may determine what is done in each detectable situation about the user.

FIG. 5 shows an example form of how such configuration parameters may be provided. In this example, the different responses to the detected biological characteristics of the user may be communicated, or otherwise set/defined using a table of biological characteristics to handle, and the corresponding actions which may be offered by the user characteristics determination module. For instance, for the biological characteristic of cyclopia (i.e. having one eye) possible corresponding actions which may be offered include issuing an exception or abort message, simply notifying the client application of the detected situation and outputting the raw biological sensor data, or applying compensation to the biological sensor data to generate compensated biological sensor data that removes, or at least reduces the effect of the user having one eye. For the biological characteristic of arrhythmia (i.e. having an irregular heartbeat) possible corresponding actions which may be offered include issuing an exception or abort message, simply notifying the client application of the detected situation and outputting the raw biological sensor data, or outputting a pre-recorded default set of data to the client application 150. For the biological characteristic of wearing circle contact lenses possible corresponding actions which may be offered include issuing an exception or abort message, simply notifying the client application of the detected situation and outputting the raw biological sensor data, or outputting a pre-recorded default set of data to the client application 150. For the biological characteristic of anisocoria (i.e. where pupil size is not the same) possible corresponding actions which may be offered include issuing an exception or abort message, simply notifying the client application of the detected situation and outputting the raw biological sensor data, or applying compensation to the biological sensor data to generate compensated biological sensor data. For the biological characteristic of strabismus (i.e. where the eyes are not aligned) possible corresponding actions which may be offered include issuing an exception or abort message, simply notifying the client application of the detected situation and outputting the raw biological sensor data, or applying compensation to the biological sensor data to generate compensated biological sensor data that removes, or at least reduces the effect of the user having one eye. It should be appreciated that many further biological characteristics may be considered, as well as many other possible corresponding actions. In effect, any and all detectable conditions about a user, and associated remedial, notification or any other action that can be taken by the disclosed middleware, or even the client application that drives the HMD immersive environment itself, maybe defined and used. The possible corresponding actions in response to the detection of a particular biological characteristic should not be considered limited by the specific combinations provided for in the table of FIG. 5, which should be considered as an example.

The information in the table of FIG. 5 may be used by an ISV to determine which expected, unexpected or uncommon biological characteristics may occur during operation of their software application. Thus, they can select the most appropriate corresponding action in response to a particular biological characteristic based on the requirements of the software application. In this way, the described examples provide a fully configurable, yet unified, framework (e.g. a middleware platform) to handle the detection of different user capabilities, and control of any subsequent adjustment of either the data being collected, or the execution of the client application itself, so that the immersive environment can take in to account the detected user differences. This allows simplification of the overall process, whilst also leveraging improvements to the detection of unusual or low probability user characteristic deviations, for use by all interested parties.

As will now be appreciated from the above detailed description of the present disclosure, there is provided a form of middleware that operates between an HMD device, and the host computing derive that runs the client application that provides the immersive environment projected/displayed by the HMD. The middleware takes the form of a separate user characteristic determination module, that takes in the input from the biological sensors available to the system (which may be on the HMD, or elsewhere, such as on controllers or the like), and from those, is able to determine whether a user exhibits some form of predetermined characteristics that is known to affect how they may interact with (or otherwise enjoy) the immersive experience, and then take appropriate action, depending on the configuration parameters in force. Those configuration parameters may be provided in advance, or on the fly, i.e. dynamically during use.

The disclosed user characteristic determination module may take the form of software, e.g. a software driver operating on the host computing system, or may take the form of a dedicated hardware module placed at a suitable juncture in the overall host system. The module or software may also run directly on, or be a part of, the HMD device. The described module may be located at any suitable point within the processing (and data collection) pathway between the HMD (including in-built, or independent, sensors) and the host computing system that runs the client application that drives the immersive environment of the HMD. Implementation may include direct forms of communications with the sensors, for example Direct Memory Access (DMA), or the like. The module or software may be located remotely to the HMD, or the host computing system supporting the HMD to provide the immersive environment, and accessed via a network connection, or through a cloud computing environment.

By providing the disclosed user characteristic determination module and associated configuration and control mechanisms, the present disclosure provides the means for the handling of all predeterminable user characteristic types to be handled accordingly, and independently from the client application, if appropriate. As such, the present disclosure enables more consistent handling, and one that is abstracted out from the client application development cycle, thereby reducing development complexity.

As such, the described user characteristics determination module and associated configuration and control mechanisms may be viewed as an abstraction layer between the HMD device projecting (i.e. displaying) the immersive environment, and the client application running on the host computing system to drive that environment, that handles user detection on behalf of the client application, so that any appropriate action can be taken. The appropriate action is fully configurable during initial development, the initialisation of the immersive environment, or later on during use.

All of the features disclosed in this specification (including any accompanying claims, abstract, and drawings) may be combined in any combination, except combinations where some of such features are mutually exclusive. Each feature disclosed in this specification, including any accompanying claims, abstract, and drawings, may be replaced by features serving the same, equivalent, or similar purpose, unless expressly stated otherwise. Thus, unless expressly states otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants that fall within the scope of the claims.

In some examples, the user characteristics determination module is a software application running on a host computing system that operates with the HMD to provide the immersive environment experienced by the user.

In some examples, the user characteristics determination module may output an exception instruction on its own, without sending any biological data (raw, or otherwise).

In some examples, the biological characteristics of a user are defined in advance by the developer of the HMD device, the independent software developer of the client application, an independent third party running a data gathering service, or a combination of these entities, or similar ones having the data to be able to carry out the definition. In some examples, the biological characteristics of a user are, in effect, a definition of how the current user of the HMD device deviates from a baseline, or "normal", user (for example one that has no discernible condition that prevents or otherwise alters their ability to fully engage with, and thereby interact with, the immersive environment provided by the HMD device, under the control or generation of the client application).

In some examples, the configuration parameters are used to define the biological characteristics of a user that the user characteristics determination module is looking for, i.e. the sort of biological characteristics of a user that may be considered outside of the nominal baseline user.

In some examples, the configuration parameters may be hardware defined, for example by hardware switches, jumpers and the like. In some examples, the mere presence of specific hardware (connected to the HMD, or contained therein) may be used to set the configuration parameters. For example, the configuration parameters may indicate that a specific biological characteristic cannot be detected based on certain hardware being missing or dis-engaged from the HMD.

An 'immersive environment', as used herein, may be any computer generated or augmented visual, auditory, or other human sense driven experience carried out by use of the HMD device on a user. Examples of such an immersive experiences may include a Virtual Reality game, and Augmented Reality development platform, where computer generated objects are placed within the visual field of the user of the HMD device, and the like. The 'immersive environment' may be termed an immersive experience (of a user) instead.

In some examples, the HMD may be for use in Virtual Reality systems, Augmented Reality systems, Mixed Reality systems, Enhanced Reality systems or Extended Reality systems. In some examples, the HMD may be for use in spatial computing systems.

An example of an eye sensor may be a camera, or any other suitable imaging device, that is directed towards the eyes of a user when the HMD is in place, ready to provide the immersive environment to the user. Multiple such sensors may be used, or a single one capable to detect the user biological characteristics for both eyes.

In some examples the biological characteristics handler, the biological sensor data collector, the compensation module, the determination logic, and any other definable module or component of the disclosed system, may be a set of software routines executed on the processing resources (e.g. processor and associated memory), a dedicated hardware implementation, or a combination of the two.

A predefined biological characteristic of the user may be considered a condition (physical or otherwise) of the user, or any other detectable parameter about a user that is indicative of said user having a variance from a baseline characteristic of a typical user, that may hinder, alter or even prevent proper use of the immersive environment. This variance from a baseline characteristic data set exhibited by a given user may be called an abnormality. The predefined response to detection of such a variance from a baseline (abnormality) may include taking any appropriate action that has been, or can be, defined to take after detection of such a type of predefined biological characteristic of the user (abort, compensate, etc). The biological characteristic of the user may be thought of as a form of user capability profile, which indicates an extent to which a user is able to utilise the resources provided by the HMD and associated host computing system running/supporting the operation of the HMD, to interact within the immersive environment. As such, the predefined biological characteristic of the user is indicative of how the user is able to interact with a client application that provides the immersive environment through the head-mountable display device.

As used herein, 'predefined' simply means 'defined in advance' of the point in time when the respective data will be tested against, assessed, or otherwise used in the subsequent processing according to the described examples. As such, the respective data (e.g. predefined response, predefined characteristic (being looked for), etc) may be defined anywhere from in the upfront initialisation, through to dynamically during operation of the module (i.e. on the fly). As such, predefined also encompasses data that is redefined during use, as well as anything set in advance by the developer, or hardware manufacturer, or the like.

In some examples, the client application drives, or generates, the immersive environment displayed by the HMD.

In some examples, determining whether biological sensor data is indicative of a predefined biological characteristic of a user may include comparing the biological sensor data to template data. In some examples, the template data may be a pre-recorded data exhibiting the predefined biological characteristic. In some examples, determining whether biological sensor data is indicative of a predefined biological characteristic of a user may include pattern recognition.

In some examples, the configuration parameters may define the biological characteristic of a user being looked for in the sensor data. In some examples, the configuration parameters may be stored in a database.

In some examples, the detected biological characteristics of a user may be stored in a user database. In some examples, the detected biological characteristics may be used to generate a profile of the user. In some examples, the detected biological characteristic of a user may be compared to a previously detected biological characteristic of the user stored in the user database. The data about users stored in the user database may be based on data, or the data itself, collected from a large number of different users of the HMD devices operating in the field. The users' data may be stored in the cloud or on a local host device.

In some examples, the compensated biological sensor data may be altered so that it does not contain the detected biological characteristic of a user, thereby compensating out that characteristic. In some examples, compensation may comprise normalising the biological sensor data values against a predefined baseline biological sensor data set. In some examples, compensation may be applied to portions of the biological sensor data above or below a defined threshold. In some examples, compensation may comprise averaging biological sensor data values with pre-recorded biological sensor data, which may be stored in a memory.

According to an example, there is provided a user characteristics determination module for use with a head-mountable display device, comprising: a biological characteristics handler, to: receive the biological sensor data about a user from a sensor; and determine whether the biological sensor data is indicative of a predefined biological characteristic of the user; and determination logic to determine and output a predefined response to the determined biological characteristic of the user; wherein the predefined biological characteristic of the user is indicative of how the user is able to interact with a client application that provides an immersive environment through the head-mountable display device.

According to some examples, there is provided the user characteristics determination module of some other examples, wherein the predefined response is one of: outputting an abort instruction to cease further execution of a client application; outputting a processing instruction to provide compensation of the biological sensor data to generate compensated biological sensor data and output the compensated biological sensor data to the client application; outputting an exception instruction and the biological sensor data to the client application; or outputting pre-recorded biological sensor data to the client application.

According to some examples, there is provided the user characteristics determination module of some other examples, wherein the predefined response used for a given biological characteristic of the user is based on configuration parameters.

According to some examples, there is provided the user characteristics determination module of some other examples, wherein the configuration parameters are provided on initialization.

According to some examples, there is provided the user characteristics determination module of some other examples, wherein the configuration parameters are provided via an Application Programming Interface, API.

According to some examples, there is provided the user characteristics determination module of some other examples, wherein further comprising a compensation module, wherein the processing instruction causes the compensation module to apply compensation to the biological sensor data to generate compensated biological sensor data.

According to some examples, there is provided the user characteristics determination module of some other examples herein, wherein the compensation applied to the biological sensor data is determined based on a predefined process.

According to some examples, there is provided the user characteristics determination module of some other examples herein, wherein the compensation module is further to receive data from an input or output device, and wherein the processing instruction further causes the compensation module to generate compensated input or output device data.

According to an example, there is provided a method for handling biological sensor data about a user of a head-mountable display device, the method comprising: receiving the biological sensor data from a sensor; determining whether the biological sensor data indicates the user has a predefined biological characteristic; and if the biological sensor data indicates the user has a predefined biological characteristic, outputting a predefined response; wherein the predefined biological characteristic of the user is indicative of how the user is able to interact with a client application that provides an immersive environment through the head-mountable display device.

According to some examples, there is provided the method of some other examples herein, wherein the predefined response is one of: outputting an abort instruction to cease further execution of a client application; outputting a processing instruction to provide compensation of the biological sensor data to generate compensated biological sensor data and output the compensated biological sensor data to the client application; outputting an exception instruction and the biological sensor data to the client application; or outputting pre-recorded biological sensor data to the client application.

According to some examples, there is provided the method of some other examples herein, further comprising receiving configuration parameters from the client application.

According to some examples, there is provided the method of some other examples herein, further comprising receiving configuration parameters via an Application Programming Interface, API.

According to some examples, there is provided the method of some other examples herein, wherein, in response to the processing instruction, a compensation module applies a compensation process to the biological sensor data to generate compensated biological sensor data.

According to some examples, there is provided the method of some other examples herein, further comprising receiving data from an input or output device; and applying, by a compensation module, a compensation process to the input or output device data to generate compensated input or output device data.

According to an example, there is provided a computer-readable storage medium comprising instructions which, when executed by a processor, cause the processor to carry out the operations of the method of some other examples described herein.

The invention claimed is:

1. A user characteristics determination module comprising:
   a biological sensor data collector to:
      receive, from a biological sensor, raw biological sensor data for a user;
   a biological characteristics handler to:
      receive, from a client application, configuration parameters that include a predefined biological characteristic, and
      determine whether the raw biological sensor data indicates the user as having the predefined biological characteristic; and
   determination logic to:
      output, to the client application when the raw biological sensor data indicates the user as having the predefined biological characteristic, a predefined response from the group consisting of:
         an abort instruction to cease execution of the client application,
         a processing instruction to compensate the raw biological sensor data,
         an exception instruction along with the raw biological sensor data, and
         pre-recorded biological sensor data.

2. The user characteristics determination module of claim 1, wherein the predefined biological characteristic is a physical disorder.

3. The user characteristics determination module of claim 2, wherein the physical disorder is from the group consisting of cyclopia, arrhythmia, anisocoria, and strabismus.

4. The user characteristics determination module of claim 1, wherein wearing of contact lenses is the predefined biological characteristic.

5. The user characteristics determination module of claim 1, wherein the biological sensor is to detect, in the user, the predefined biological characteristic.

6. The user characteristics determination module of claim 1, wherein the biological characteristics handler is to receive the configuration parameters via an Application Programming Interface (API).

7. The user characteristics determination module of claim 1, further comprising:
   a compensation module to:
      apply, to the raw biological sensor data when the processing instruction is the predefined response, a compensation process that converts the raw biological sensor data into compensated biological sensor data.

8. The user characteristics determination module of claim 7, wherein the compensation process includes machine learning.

9. The user characteristics determination module of claim 7, wherein the compensation module is to:
   output, to the client application, the compensated biological sensor data.

10. The user characteristics determination module of claim 7, wherein the compensation process counters an effect of the predefined biological characteristic on the user.

11. The user characteristics determination module of claim 7, wherein the compensation module is to:
   apply, during compensation process, input or output device data when converting the raw biological sensor data into the compensated biological sensor data.

12. The user characteristics determination module of claim 11, wherein the compensation module is to:
   receive, from an input or output device, the input or output device data.

13. A head-mountable display device comprising:
   the user characteristics determination module of claim 7,
   wherein the client application is to drive an immersive environment provided by the head-mountable display device.

14. The head-mountable display device of claim 13, wherein the client application, when applying the compensated biological sensor data, is to alter the immersive environment.

15. The head-mountable display device of claim 13, wherein the abort instruction commands the client application to terminate the immersive environment.

16. A method for handling biological sensor data about a user of a head-mountable display device, the method comprising:
   receiving, from a biological sensor, raw biological sensor data for a user;
   receiving, from a client application, configuration parameters that include a predefined biological characteristic;

determining whether the raw biological sensor data indicates the user as having the predefined biological characteristic; and outputting, to the client application when the raw biological sensor data indicates the user as having the predefined biological characteristic, a predefined response from the group consisting of:
- an abort instruction to cease execution of the client application,
- a processing instruction to compensate the raw biological sensor data,
- an exception instruction along with the raw biological sensor data, and
- pre-recorded biological sensor data.

17. The method of claim 16, further comprising:
applying, to the raw biological sensor data when the processing instruction is the predefined response, a compensation process that converts the raw biological sensor data into compensated biological sensor data.

18. A computer-readable storage medium comprising instructions which, when executed by a user characteristics determination module, cause the user characteristics determination module to:

receive, from a biological sensor, raw biological sensor data for a user;

receive, from a client application, configuration parameters that include a predefined biological characteristic;

determine whether the raw biological sensor data indicates the user as having the predefined biological characteristic; and output, to the client application when the raw biological sensor data indicates the user as having the predefined biological characteristic, a predefined response from the group consisting of:
- an abort instruction to cease execution of the client application,
- a processing instruction to compensate the raw biological sensor data,
- an exception instruction along with the raw biological sensor data, and
- pre-recorded biological sensor data.

19. The computer-readable storage medium comprising instructions of claim 18, which, when executed by the user characteristics determination module, cause the user characteristics determination module to:

apply, to the raw biological sensor data when the processing instruction is the predefined response, a compensation process that converts the raw biological sensor data into compensated biological sensor data.

* * * * *